United States Patent [19]

Fuhrhop

[11] 4,389,038
[45] Jun. 21, 1983

[54] SCARFING APPARATUS
[75] Inventor: Ronald E. Fuhrhop, West Nyack, N.Y.
[73] Assignee: Union Carbide Corporation, Danbury, Conn.
[21] Appl. No.: 338,203
[22] Filed: Jan. 11, 1982
[51] Int. Cl.³ .............................................. B23K 7/06
[52] U.S. Cl. ................................................... 266/51
[58] Field of Search .......................... 148/9.5; 266/51
[56] References Cited
U.S. PATENT DOCUMENTS 2,483,479 10/1949 Smith et al. ............................ 266/51
2,515,301 7/1950 Hughey ................................. 266/51
3,477,646 11/1969 Lytle ..................................... 266/51

Primary Examiner—W. Stallard
Attorney, Agent, or Firm—Eugene Lieberstein

[57] ABSTRACT

Scarfing apparatus for thermochemically treating a metal surface including a desurfacing head and an upper and lower block extending from the head in spaced apart relation to define a slot-like nozzle, output discharge means in at least one of the blocks for discharging a gas and a gas distribution assembly for distributing gas evenly across said output discharge means with the gas distribution assembly including an inlet supply chamber, a manifold discharge chamber which intersects the inlet supply chamber to form a ledge and a gas redistribution member supported upon said ledge for redirecting gas flow from said inlet supply chamber into said manifold discharge chamber.

8 Claims, 9 Drawing Figures

SCARFING APPARATUS

This invention relates to an apparatus for thermochemically conditioning ferrous metal bodies, by the process commonly referred to as scarfing and more particularly to a gas distribution assembly for controlling the uniformity of distribution of fuel gas and oxygen through output discharge means for each gas. Such output discharge means may represent for purposes of the present invention, either a series of uniformly sized orifices arranged in a row, or an elongated slot.

In the manufacture of steel it is customary to use scarfing apparatus to remove surface defects from a steel body such as an ingot, slab, bloom or billet by performing a desurfacing operation. The desurfacing operation is initiated by preheating the workpiece to form a molten puddle using a combination of combustible fuel gas and oxygen. Fuel gas and oxygen are separately supplied to the scarfing apparatus and may be mixed before or after discharge therefrom to form a preheat flame. In the preferred arrangement the preheat fuel gas and oxygen are each discharged separately through a series of orifices arranged in rows located in the upper preheat block of the scarfing apparatus and in a substantially parallel arrangement. The scarfing reaction is carried out with a stream of scarfing oxygen discharged from the scarfing apparatus and preferably through an elongated slot. The flows of fuel gas and oxygen through their respective output discharge means should be uniformly distributed to assure an even intensity preheat flame and scarfing oxygen stream.

Scarfing apparatus, in general, consists of one or more scarfing units of from about four to about eleven inches in width. The requisite number of discharge orifices for the preheat fuel gas and oxygen streams are commensurate with the scarfing unit width and, in general, vary from about fifteen to forty-five in number. In the past it was necessary to manifold the supply of preheat gases to these discharge orifices through a number of intermediate chambers interconnected by cross drillings in order to assure an even and uniform flow distribution through each such discharge orifice. In the scarfing unit having forty-five preheat discharge orifices, for example, it was necessary to supply preheat fuel from a conventional source of supply through an arrangement of three intermediate manifold chambers interconnecting the gas inlet from the source of supply to the forty-five discharge orifices: a first manifold chamber was directly coupled to the inlet supply opening, a second manifold chamber was coupled to the first manifold chamber through four interconnected cross drillings, and the third manifold chamber was connected to the second through eight additional cross drillings.

One technique used to overcome the complexity and cost associated with scarfing oxygen and preheat gas distribution arrangements in the past involved the use of a gas baffle which was located in the manifold chamber and interposed between the supply inlet and the discharge orifices to uniformly disperse the flow of supply gas along the length of the output discharge means. The gas baffle used was not only of complex design and expensive to fabricate but also required careful positioning so as not to bias the flow of supply gas toward any one side of the output means which would defeat the objective of the baffle arrangement.

It is, accordingly, the principal objective of the present invention to provide a scarfing apparatus for thermochemically conditioning ferrous metal bodies having a gas distribution assembly for uniformly distributing feed gas through the output discharge means in the scarfing apparatus.

Other objects and advantages of the present invention will become apparent from the following detailed description of the invention when read in conjunction with the accompanying drawings of which:

Figure 1:
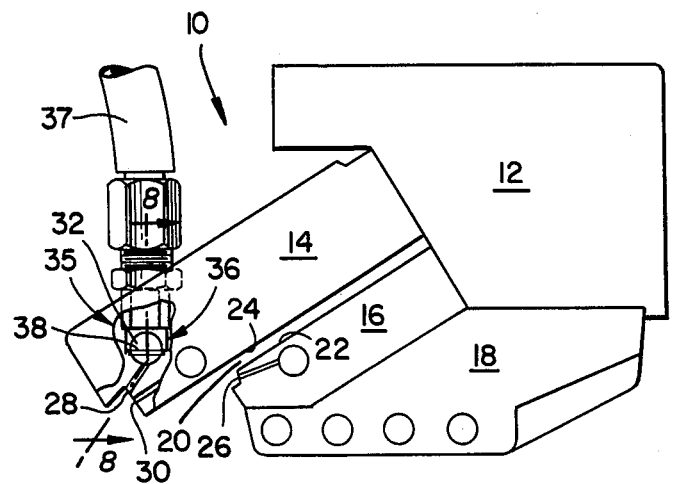
FIG. 1 is a side elevation of the scarfing apparatus of the present invention with part of the upper preheat block shown broken away to illustrate the construction of the gas distribution assembly for distributing supply gas from an input supply source to the preheat nozzle orifices.

Referring now to FIG. 1 the preferred scarfing apparatus of the present invention is generally depicted by the reference numeral 10, including a desurfacing head 12, an upper and lower preheat block 14 and 16 respectively and a shoe 18. The shoe 18 is adapted to maintain a constant working relationship between the scarfing apparatus 10 and the workpiece (not shown). The upper and lower blocks 14 and 16 are called preheat blocks because preheating flames are discharged from either or both of these blocks for initiating the scarfing operation.

A slot-like scarfing nozzle 20, from which a sheet like stream of scarfing oxygen is discharged, is formed by the lower surface 24 of the upper preheat block 14 and the upper surface 22 of the lower preheat block 16. The lower block 16 is provided with a row of fuel gas orifices 26 for discharging fuel gas in a stream directed at the stream of oxygen which issues from the slot-like nozzle.

The upper preheat block 14 is provided with a row of substantially equal sized preheat fuel gas orifices 30 and a row of sustantially equal sized preheat oxygen ports 28 arranged in a parallel relationship relative to one another. The preheat fuel gas orifces 30 and the preheat oxygen ports 28 respectively are each closely spaced together. The number of orifices in each row is substantially equal for any given size scarfing unit and will vary in number between about five to about forty-five depending upon the designed width of the scarfing unit. The row of preheat fuel gas orifices 30 communicate with a common discharge manifold chamber 32 into which is fed a supply of fuel gas from a source of supply (not shown) through the gas distribution assembly 35 of the present invention. The gas distribution assembly 35 comprises an inlet supply chamber 36 which intersects the manifold chamber 32 to provide a direct path for oxygen from the inlet supply chamber 36 to the manifold chamber 23 and a flow redistribution member 38 located at the intersection between the inlet supply chamber 36 and the manifold chamber 32 to control the redistribution of oxygen into the manifold chamber 32. The inlet supply chamber 36 is directly connected to an external source of supply (not shown) through a supply hose 37. The redistribution member 38 provides an "entrance flow area" of controlled size at the intersection between the inlet supply chamber 36 and the manifold chamber 32. For purposes of the present invention, and as will be further explained, the "entrance flow area" is defined as two times that cross-sectional area of the manifold chamber which is open to unobstructed flow from the inlet supply chamber.

The gas distribution assembly 35 may be duplicated to distribute fuel gas through the orifices 30 as well as preheat oxygen through the ports 28. Likewise additional gas distribution assemblies 35 designed in accordance with the teachings of the present invention may be used to distribute fuel gas to the fuel gas orifices 26 in the lower block 16 and/or scarfing oxygen through an output discharge means (now shown) in the desurfacing head into the slot-like scarfing nozzle 20.

Figure 2:
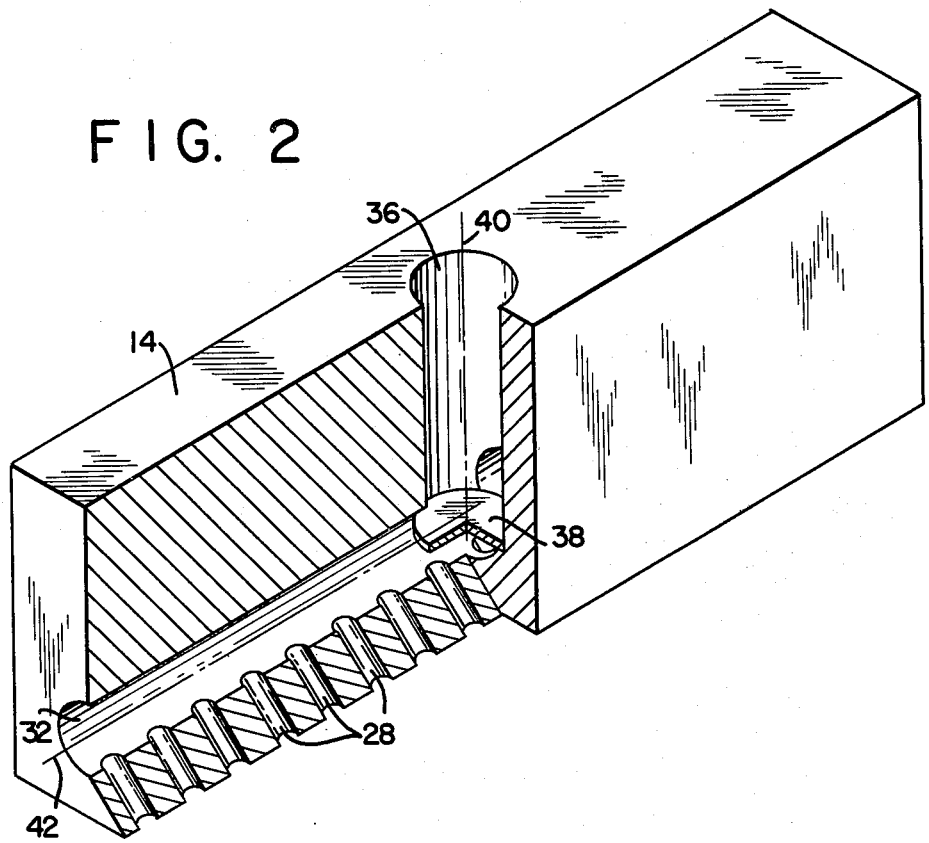
FIG. 2 is a perspective view of the preferred construction of the gas distribution assembly of FIG. 1.
Figure 4:
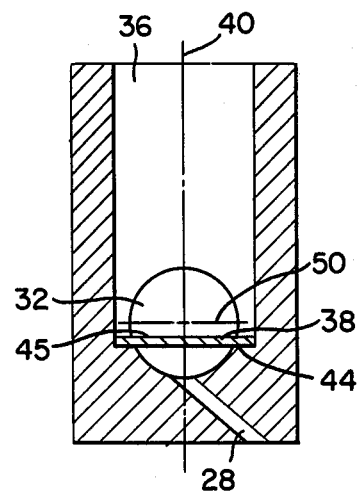
FIG. 4 is a cross-sectional view of the gas distribution assembly taken along the lines 4—4 of FIG. 3.
Figure 3:
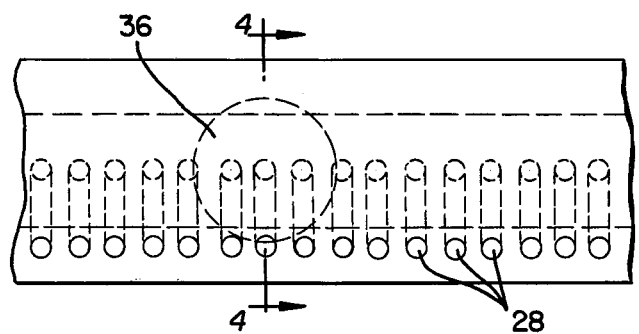
FIG. 3 is a bottom view of the gas distribution assembly of FIG. 2.

The preferred construction of the gas distribution assembly 35 is shown in FIGS. 2 to 4 inclusive. The inlet supply chamber 36 is preferably a single round bore formed in the upper preheat block 14. The discharge manifold chamber 32 is also preferably, a single round cross bore. The discharge manifold chamber 32 intersects the inlet supply chamber 36 preferably at right angles although this is not an essential requirement. It is also not essential for the longitudinal axis 40 of the inlet supply chamber 36 to intersect the longitudinal axis 42 of the discharge manifold chamber 32. It is preferred that the diameter of the bore defined by the inlet chamber 36 be larger than the diameter of the bore defined by the discharge chamber 32 to assure the formation of a ledge or shoulder 44 as seen in FIG. 4. The flow redistribution member 38 is supported by the shoulder 44 formed by the intersecting chambers 32 and 36 respectively.

Figure 6:
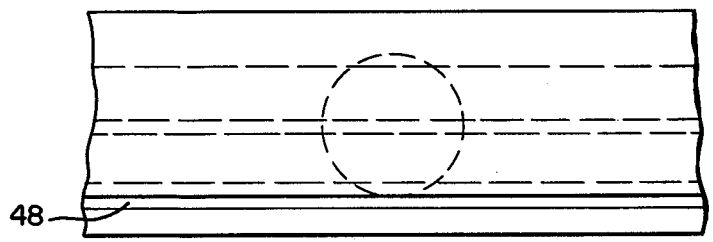
FIG. 6 is a bottom view of the gas distribution assembly of FIG. 5.
Figure 5:
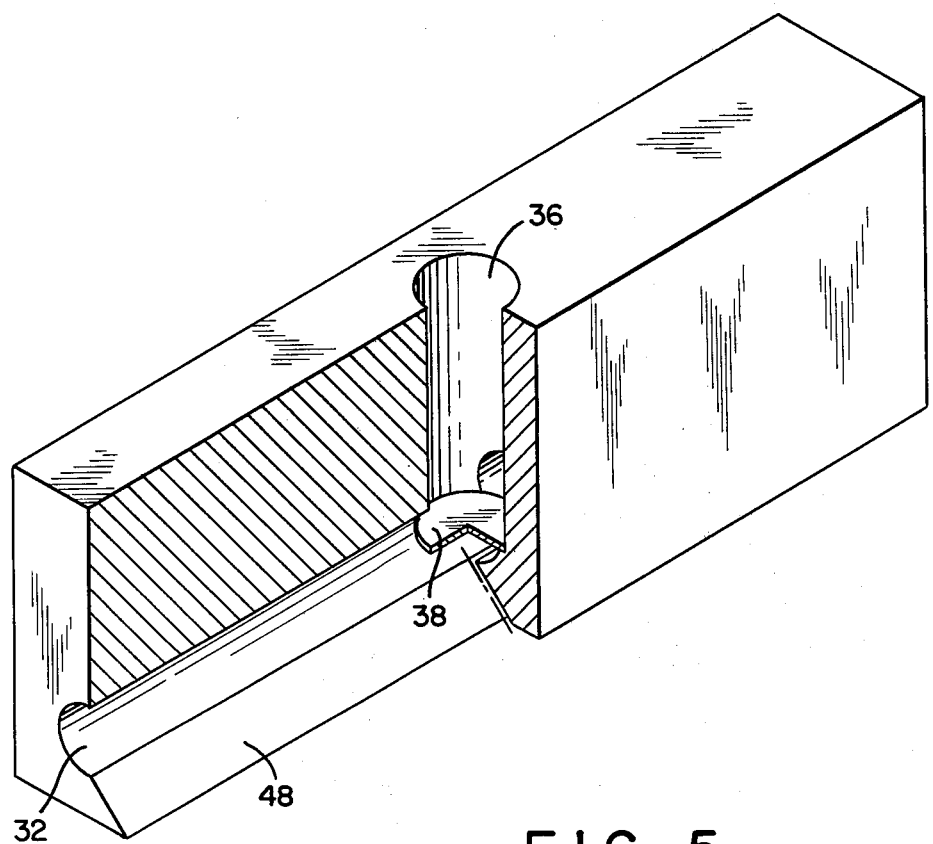
FIG. 5 is a perspective view identical to FIG. 2 except that the preheat orifices 28 are replaced with an elongated slot 48.

The flow redistribution member 38 is preferably a disk disposed in a plane substantially perpendicular to the direction of flow through the inlet supply chamber 36. The surface 45 of the disc 38 need not be flat, although this is preferred. The circumference of the member 38 should preferably be substantially equal to the diameter of the inlet chamber 36 to provide an interference fit. With the disk 38 in place gas flow is distributed equally through all of the discharge orifices 28. Although the output discharge means is preferably represented by a series of exit ports a single slot or a series of slots may alternatively be used. FIGS. 5 and 6 show the equivalent gas distribution assembly 35 with a single elongated slot 48 for discharging the manifold supply gas. The disk 38 distributes gas from the inlet supply chamber 36 evenly along the entire length of the slot 48.

Figure 7:
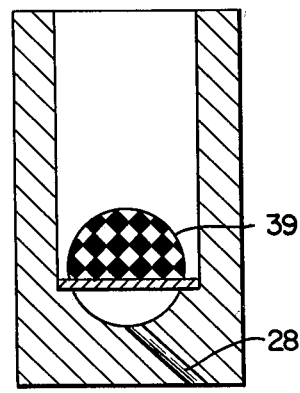
FIG. 7 is a cross-sectional view of the gas distribution assembly similar to FIG. 4 with one half of the "entrance flow area" between the gas supply inlet opening and the discharge manifold symbolically illustrated by a checkerboard pattern.

The inlet supply chamber 36, the flow redistribution member i.e. disk 38 and the discharge manifold chamber 32 should be sized so that the entrance flow area is equal to or larger than the total exit flow area as represented by the cumulative area of exit orifices 28 or the exit area formed by the elongated slot 48. Because of the complex shape of the opening formed by the intersection of disk 38 with the inlet chamber 36 and manifold 32 the two dimensional area approximation of the opening as indicated by the checkerboard pattern 39 in FIG. 7 is used to determine the entrance flow area calculation. The area formed by the checkerboard pattern is approximately one half of the entrance flow area.

The entrance flow area to exit flow area ratio will also control the flow rate of gas through the system. For a given total exit flow area, the required entrance flow area will increase as the gas flow rate through the system increases i.e., the entrance area to exit area ratio will increase. For the scarfing system of the present invention as exemplified by FIG. 1 and the corresponding description, the entrance flow area to exit flow area ratio should be between about 4 to 6 for best operation.

The disk 38 should normally be located substantially at or below the centerline 50 of the discharge manifold chamber 32. If the disk 38 is moved above the centerline 50 it will reduce the entrance flow area limiting the number of discharge orifices 27 that may be used within the confines of the above noted relationships.

An example of typical design parameters for the gas distribution assembly of the present invention for use in distributing oxygen through the preheat oxygen ports 28 in the scarfing apparatus of FIG. 1 is as follows:

Entrance flow area to exit flow area ratio—5.2
Maximum oxygen flow for system—11,000 NCFH (14.7 psia, 70° F.) [290SCMH(1atm, 0° C.)].
Inlet supply chamber diameter (cylindrical bore)—0.906" dia (23 mm).
Inlet flow area—0.65 sq. in. (4.2 sq.cm.)
Flow redistribution member=0.907" Dia×0.062 THK (23 mm×1.6 mm. THK)
Discharge manifold chamber (cylindrical bore)—0.812" Dia (20.6 mm)
Discharge orifice(s)—45 round holes each 0.0625 inches in diameter (1.6 mm).
Exit flow area—0.14 sq. in. (0.9 sq. cm.)
Entrance flow area—0.73 sq. in. (4.7 sq. cm.).

Figure 8:
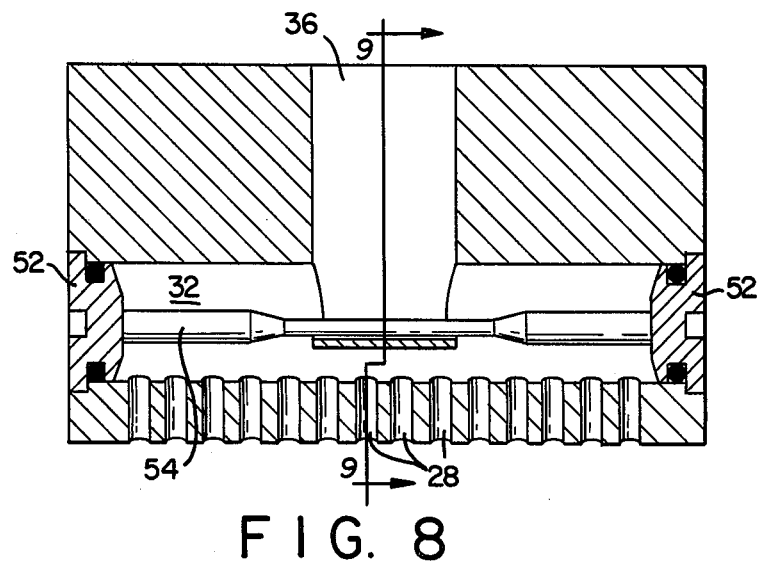
FIG. 8 is a cross-sectional view of the gas distribution assembly taken along the lines 8—8 of FIG. 1 illustrating the preferred end seal arrangement for the assembly.
Figure 9:
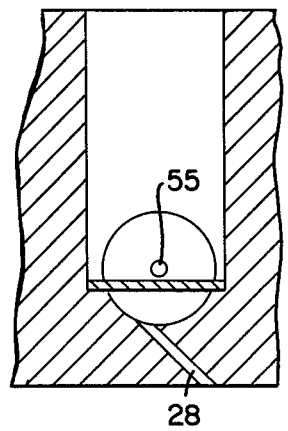
FIG. 9 is a cross-sectional view similar to FIG. 4 taken along the lines 9—9 of FIG. 8.

The discharge manifold chamber 36 may be sealed at both ends by end caps 52 as shown in FIG. 8. In the preferred construction the end caps 52 are secured to a tie rod 54 which is threadably coupled to both of the end caps 52. The tie rod 54 will extend through the entrance flow area and as such should have as small a diameter as practicality allows. The cross sectional area 55 of the tie rod 54 within the entrance flow area should for mathematical accuracy be subtracted from the calculated valve for the checkerboard approximation of FIG. 7.

I claim:
1. Scarfing apparatus for thermochemically treating a metal surface including a desurfacing head having an output discharge means for discharging a gas into a slot-like scarfing nozzle defined by an upper and lower preheat block, output discharge means in each preheat heat block for discharging gas, and a gas distribution assembly for distributing gas evenly across at least one of said output discharge means, wherein said gas distribution assembly comprises:

a manifold discharge chamber communicating with said output discharge means;
 an inlet supply chamber adapted to be connected to a supply source of fuel gas or oxygen and interconnecting said manifold discharge chamber to form a ledge; and
 a flow redistribution member supported upon said ledge at the intersection between said inlet supply chamber and said manifold discharge chamber for redirecting gas flow from said inlet supply chamber into said manifold discharge chamber.

2. Scarfing apparatus as defined in claim 1 wherein said flow redistribution member is a disc lying in a plane substantially perpendicular to the direction of gas flow through said inlet supply chamber.

3. Scarfing apparatus as defined in claim 2 wherein said inlet supply chamber is of a uniform cross-sectional area with a predetermined diameter.

4. Scarfing apparatus as defined in claim 3 wherein said manifold discharge chamber is uniform in cross-sectional area and has a diameter substantially equal to or less than the diameter of said supply chamber.

5. Scarfing apparatus as defined in claim 4 wherein said disc is disposed within said manifold discharge chamber in a position substantially at or below the centerline of said manifold discharge chamber to form an entrance flow area of predetermined size.

6. Scarfing apparatus as defined in claim 5 wherein said disk has a diameter substantially equal to the diameter of said inlet supply chamber.

7. Scarfing apparatus as defined in claim 6 wherein said output discharge means is a series of substantially uniformly sized orifices having a predetermined cumulative exit flow area.

8. Scarfing apparatus as defined in claims 5 or 7 wherein the ratio of said entrance flow area to said exit flow area is between about 4 to 6.

* * * * *